United States Patent [19]

Janda

[11] Patent Number: 4,959,395

[45] Date of Patent: Sep. 25, 1990

[54] BULK POLYMERIZED MOLDED PRODUCTS CONTAINING CYCLOOLEFIN MONOMENTS WITH MICROENCAPSULATED BLOWING AGENTS

[75] Inventor: Dennis J. Janda, Parma, Ohio

[73] Assignee: The B. F. Goodrich Company, Akron, Ohio

[21] Appl. No.: 483,300

[22] Filed: Feb. 21, 1990

Related U.S. Application Data

[60] Continuation of Ser. No. 425,610, Oct. 23, 1989, abandoned, which is a division of Ser. No. 304,215, Jan. 31, 1989, abandoned, which is a continuation-in-part of Ser. No. 212,703, Jun. 28, 1988, abandoned.

[51] Int. Cl.$^5$ ............................................. C08J 9/22
[52] U.S. Cl. ................................... 521/54; 521/134; 521/149; 521/150; 526/281; 526/282; 526/283; 526/289; 526/290
[58] Field of Search .................. 521/54, 134, 149, 150

[56] References Cited

U.S. PATENT DOCUMENTS

| | | |
|---|---|---|
| 3,515,569 | 6/1970 | Walters et al. |
| 3,557,072 | 1/1971 | Vergne et al. |
| 3,615,972 | 10/1971 | Morehouse, Jr. |
| 3,778,420 | 12/1973 | Brown et al. |
| 3,790,545 | 2/1974 | Minchak |
| 3,819,463 | 6/1974 | Ervin et al. |
| 3,853,830 | 12/1974 | Minchak |
| 3,864,181 | 2/1974 | Wolinski et al. |
| 4,002,815 | 12/1977 | Minchak |
| 4,006,273 | 2/1977 | Wolinski et al. |
| 4,075,138 | 2/1978 | Garner |
| 4,136,247 | 12/1979 | Tenney et al. |
| 4,136,248 | 1/1979 | Tenney et al. |
| 4,136,249 | 1/1979 | Tenney et al. |
| 4,178,424 | 12/1979 | Tenney et al. |
| 4,380,617 | 4/1983 | Minchak et al. |
| 4,426,502 | 1/1984 | Minchak |
| 4,458,037 | 7/1984 | Leach |
| 4,496,668 | 1/1985 | Newburg |
| 4,496,669 | 1/1985 | Leach |
| 4,535,097 | 8/1985 | Newburg |
| 4,568,660 | 2/1986 | Klosiewicz |
| 4,584,425 | 4/1986 | Tom |
| 4,598,102 | 7/1986 | Leach |
| 4,604,408 | 8/1986 | Newburg |
| 4,689,380 | 8/1987 | Nahm |
| 4,696,985 | 9/1987 | Martin |
| 4,699,963 | 10/1987 | Klosiewicz |
| 4,703,068 | 10/1987 | Nguyen |
| 4,748,216 | 5/1988 | Tom |

FOREIGN PATENT DOCUMENTS 5998564  6/1984  Japan .

OTHER PUBLICATIONS

Pierce & Stevens Industrial Group Product Information Publications Microlite 126 and Microlite 105.
Pierce & Stevens Industrial Group Product Information Publication Miralite 177.
Pierce & Stevens Industrial Group Product Information Publication
Expancel Product Information Bulletin.
Expancel Product Specification Publication .
Pierce & Stevens Industrial Group Product Information Publication (4–84).
The Society of Plastics Industry, Inc. "Organic Microspheres for Supertough Syntactic Foams", Melber et al., (1–16–84).
Expancel publication (2–27–85).
Expancel Product Program Publication.

*Primary Examiner*—Morton Foelak
*Attorney, Agent, or Firm*—Venable, Baetjer, Howard & Civiletti

[57] ABSTRACT

This invention is directed to the use of microencapsulated blowing agents in the bulk polymerization of cycloolefin monomers by ring-opening polymerization. These microencapsulated blowing agents aid in filling molds during reaction injection molding procedures such that both surfaces of the article being molded remain in contact with their respective mold surfaces eliminating sink marks in these surfaces. In addition, the microencapsulants may be introduced at higher levels which provide structural foams with the polymers from cycloolefin monomers.

19 Claims, No Drawings

BULK POLYMERIZED MOLDED PRODUCTS CONTAINING CYCLOOLEFIN MONOMONENTS WITH MICROENCAPSULATED BLOWING AGENTS

FIELD OF THE INVENTION

This application is a continuation application of U.S. Ser. No. 07/425,610 filed Oct. 23, 1989 (now abandoned) which is a divisional application of U.S. Ser. No. 304,215 filed Jan. 31, 1989 now abandoned, which is a continuation-in-part application of Ser. No. 212,703 filed June 28, 1988 (now abandoned).

This invention is directed to polymers of cycloolefin monomers obtained by ring-opening polymerization. More particularly, this invention provdes a means for including a blowing agent in a bulk polymerization formulation of cycloolefin monomers and the unique molded products obtained therefrom. By incorporating microencapsulated blowing agents, this invention eliminates the need for the surfactants required when conventional blowing agents are utilized in reaction injection molding formulations of cycloolefin monomers.

BACKGROUND OF THE INVENTION

Polymers obtained by ring-opening polymerization of cycloolefin monomers that contain the norbornene moiety, referred to herein as cycloolefins or cycloolefin monomers, are well known. For example, U.S. Pat. Nos. 4,136,249; 4,178,424; 4,136,247; and 4,136,248, assigned to the same assignee as the present invention, describe such polymers and each is incorporated herein by reference for the description of the polymers therein.

Depending on the specific cyloolefins chosen, ring-opening polymerization of cycloolefins yields unsaturated linear, branched and crosslinked polymers. These polymers are known to exhibit attractive property profiles for many polymer applications, such as automotive and non-automotive body panel equipment housings, furniture, window frames and shipment dunnage.

Dicyclopentadiene, for example, is a common cycloolefin monomer used to prepare ring-opened polymerized polymers in that this cycloolefin monomer is readily available as a by-product in ethylene production. U.S. Patents directed to polymers from dicyclopentadiene include U.S. Pat. Nos. 3,778,420; 3,781,257; 3,790,545; 3,853,830; 4,002,815; and 4,239,874. Other well known cycloolefin monomers include bicyclic norbornene and substituted bicyclic norbornenes, as do other U.S. patents such as U.S. Pat. Nos. 3,546,183; 2,721,189; 2,831,037; 2,932,630; 3,330,815; 3,367,924; 3,467,633; 3,836,593, 3,879,343; and 4,010,021. The above patents are incorporated herein by reference for their disclosure of polymers obtained from ring-opening polymerization of bicyclic norbornenes and substituted bicyclic norbornenes. Tetracyclododecene and substituted tetracyclododecenes are also well known cycloolefins. These are made by Diels-Alder reaction of cyclopentadiene with bicyclic norbornene or the appropriate substituted bicyclic norbornene. Ring-opening polymerization of tetracyclododecene with other bicyclic olefin comonomers has been disclosed in U.S. Pat. No. 3,557,072, incorporated herein by reference for the polymerizations disclosed therein.

Work has been done on bulk ring-opening polymerization of cycloolefins. Bulk polymerization is defined as polymerization in the absence of a solvent or diluent for the feed monomer. Minchak, U.S. Pat. No. 4,426,502, discloses a bulk polymerization process for "norbornene type monomers" which include norbornene, dicyclopentadiene, tricyclopentadiene (cyclopentadiene trimer) and tetracyclododecene.

Early attempts at the bulk polymerization of cycloolefins were too rapid in the absence of a solvent and therefore, uncontrollable. Furthermore, initial bulk polymerization attempts resulted in materials that were very dark, had poor physical properties and poor appearance.

Further developments in the bulk polymerization of cycloolefins led to another approach, which, likewise, was unsuccessful. This approach was characterized by splitting a monomer charge into two equal portions, one containing a catalyst and the other containing a cocatalyst. The object was to mix the two portions of the monomer charge at room temperature and then transfer the mix to a heated mold where polymerization and hardening would occur very quickly. It was discovered that instantaneous reaction took place upon contact of the two portions, whereby a solid polymer barrier was formed between the two portions of the monomer charge, encapsulating some of the monomer from each portion which prevented mixing.

Minchak, in U.S. Pat. No. 4,425,502, describes a modified metathesis catalyst system for bulk ring-opening polymerization of cyclic olefins containing a norbornene group. The process includes the steps of mixing the monomer with an organoammonium molybdate or tungstate metathesis catalyst and an alkoxyalkyl aluminum halide cocatalyst at a temperature at which polymerization of the monomer remains essentially dormant for at least one hour, and conveying the resulting mixture to a mold maintained at a temperature at which polymerization of the monomer takes place in less than two minutes. The Minchak metathesis catalyst system allows for control of the instantaneous reaction between the two portions of the monomer charge, one containing metathesis catalyst and other containing cocatalyst, which permits adequate mixing of the two portions without encapsulation, thereby permitting use within a reaction injection molding (RIM) process.

In typical RIM operations, chargesof monomer are separately mixed with the two-parts of the metathesis-catalyst system to form feed solutions for charging a mixing head of a RIM machine. Once mixed, the monomer solutions with catalyst and cocatalyst are injected into a mold.

While the metathesis catalyst systems of Minchak provide adequate control over the bulk polymerization reaction to obtain molded structurally sound articles by RIM processes, there are other obstacles the manufacturers of molded articles must face. For example, if such a manufacturer is to take advantage of a bulk polymerization reaction of cycloolefins in a reaction injection molding process, the molder must obtain complete fill of the mold with the reactive formulation. Where appearance parts are to be molded the manufacturer is concerned with sink marks in the surface of the molded article. Molded products obtained from RIM processes are vulnerable to such defects. The use of blowing agents in the RIM formulation has been found to counteract this problem.

In RIM formulations, blowing agents have been found to (1) counteract the tendency of the formulation to shrink upon polymerization, i.e., prevent sink marks in the product surface and (2) prevent humid air from being drawn into the mold cavity. Humid air deactivates the metathesis catalyst system creating "wet surfaces" on the parts.

Newburg, in U.S. Pat. No. 4,535,097, describes a metathesis-catalyst system which incorporates a blowing agent when polymerizing dicyclopentadiene monomer. Other metathesis-catalyst systems incorporating blowing agents are disclosed in U.S. Pat. Nos. 4,458,037; 4,496,668; 4,496,669; 4,568,660; 4,584,425; 4,598,102; 4,604,408; 4,696,985; 4,699,963; and 4,703,068. These systems incorporate any conventional blowing agents used in RIM processes or related processes that do not poison or otherwise adversely affect the metathesis catalyst. Such catalyst systems may include blowing agents such as low boiling organic compound or an inert gas.

When blowing agents such as nitrogen, carbon dioxide, chlorofluorocarbons, methylene chloride and various low boiling hydrocarbons such as butane, pentane, hexane and heptane are added to the RIM formulation, the RIM process requires the addition of a surfactant to stabilize gases produced as microbubbles. This surfactant can interfere with the adhesion of fillers and reinforcements to the polymer matrix.

The present invention solves this problem by utilizing a microencapsulated blowing agent (microsphere) in the reaction injection molding formulation which does not require the addition of surfactant. Microspheres which encapsulate liquid blowing agents are well known.

Morehouse et al., in U.S. Pat. No. 3,615,972, disclose thermoplastic microspheres which encapsulate a liquid blowing agent. Such microspheres are said to be readily prepared from a wide variety of materials.

Garner, in U.S. Pat. No. 4,075,138, discloses a method for the preparation of a synthetic resinous thermoplastic microsphere employing 60-90 parts by weight vinylidene chloride and from 40-10 parts by weight of acrylonitrile.

One such microsphere is currently available under the trade name EXPANCEL®. EXPANCEL is a white, spherically formed particle with a shell consisting basically of a copolymer of vinylidene chloride and acrylonitrile. The polymeric shell encapsulates the blowing agent, liquid isobutane, under pressure.

These microspheres are known to expand when they are subjected to heat which softens the thermoplastic shell and simultaneously volatilizes the encapsulated hydrocarbon. Their ability to expand at a given temperature, along with their extremely low weight and their elasticity, have made them useful in a wide area of applications: (1) in printing ink to create a three-dimensional pattern on wallpaper and other textiles; (2) in paper and board and other fibre products to lower density and to improve bending stiffness; (3) in plastic products to lower weight and to improve impact resistance; (4) in paints and putties to improve applicability and to reduce weight; (5) in cables to improve capacity; (6) in explosives to improve sensitivity; (7) in synthetic foams; and (8) as an alternative to conventional blowing agents for some resins, as disclosed in Japanese Patent Publication JP-60-244511.

Microencapsulated blowing agents have been used in a reaction injection molding process as described in Japanese Patent Publication No. 59-98564 [Japanese Patent Publication (KOKAI) 60-244511]. A heat-expandable microcapsule is activated during the curing stage of a reaction injection molding process.

The authors of the Japanese Patent Publication disclose the use of a low boiling hydrocarbon liquid in an outer shell of vinylidene chloride and acrylonitrile encapsulant in manufacturing "polyurethane elastomer" molded products by reaction injection molding. It is said that the products may be made with no sink marks. The claimed dosage of thermally expanded microencapsulate is 0.001–20 parts by weight per 100 parts by weight reactive mixture.

While the authors of the Japanese Patent Publication do not "deny" the applicability of the invention to other polyurethane resin systems or other synthetic resins, cycloolefin monomers are not said to be particularly effective. Furthermore, there is no teaching of the use of microen-capsulated blowing agents in a reaction injection molding process which provide polymers of cycloolefinic monomers obtained by ring-opening polymerization.

The present invention is based on the discovery that adding microspheres to bulk polymerization formulations of cycloolefins provides the advantages of a blowing agent without the need for a surfactant.

SUMMARY OF THE INVENTION

The present invention provides reactive formulations for bulk polymerization reactions which comprise cycloolefin monomers, a metathesis catalyst system and an encapsulated blowing agent. The blowing agent preferably has a boiling point below 60° C. and the encapsulant comprises a synthetic resinous thermoplastic polymer which is preferably insoluble in the cycloolefin monomers and has a softening point below 180° C. The encapsulant does not inactivate the metathesis catalyst or cocatalyst of the catalyst system and is substantially impermeable to the blowing agent.

The microspheres can be either expanded or unexpanded. Their diameters are preferably from 2 to 200 $\mu$m. Expancel ® microspheres have been found particularly useful. These microspheres comprise isobutane encapsulated with vinylidene-acrylonitrile copolymers. The quantity of encapsulated blowing agent within the reactive formulation can range from 0.05 to 5.0 weight percent of unexpanded microspheres such as Expancel 551 DU and 1.0 to 50.0 volume percent of expanded microspheres such as Expancel 551 DE. For structural foam applications, the quantity of expanded encapsulated blowing agents is preferably within the range of 10 to 50 volume percent. Expanded encapsulated blowing agents normally have a density range of 0.027 to 0.055 gms per milliliter. For applications wherein only shrinkage during in-mold polymerization is to be counteracted, preferably from 0.1 to 1.0 weight percent of unexpanded microspheres are added. However, either application type can employ unexpanded or expanded microspheres or mixtures thereof. In preferred embodiments, these reactive formulations polymerize to provide solid articles by RIM (reaction injection molding) or RTM (resin transfer molding) or casting procedures.

Also provided by this invention are solid molded articles which comprise polymers obtained by bulk ring-opening polymerization of cycloolefin monomers having dispersed therein encapsulated blowing agent. The preferred structures provided by this invention include two or more finished surfaces. One class of preferred structures are those with reinforcing agents embedded therein, such as mats of woven or unwoven glass or polyester fibers.

Another embodiment of this invention is directed to the feedstock components which form the reactive formulation. These comprise cycloolefin monomers, an encapsulated blowing agent and one of either a metathesis catalyst or cocatalyst which form part of a metathesis catalyst system.

DESCRIPTION OF THE PREFERRED EMBODIMENT

The reactive formulation for a bulk polymerization reaction provided by the present invention comprises: cycloolefin monomers having a norbornene functional group; a metathesis catalyst system and an encapsulated blowing agent.

Cycloolefin Monomers

Cycloolefin monomers, also referred to as norbornene-type monomers and cycloolefins, that form part of the embodiments of this invention either as unreacted monomers or as polymers, are characterized by the presence of at least one norbornene group, identified by formula I, that can be substituted or unsubstituted:

 (I)

Pursuant to this definition, suitable cycloolefin monomers include substituted and unsubstituted norbornenes, dicyclopentadienes, dihydrodicyclopentadienes, trimers of cyclopentadienes, tetracyclododecenes, tetramers of cyclopentadienes, hexacycloheptadecenes, ethylidene norbornenes and vinylnorbornenes. The substituents can be any which do not poison or deactivate the polymerization catalyst. These include hydrogen, $C_1$-$C_{20}$ alkyl or aryl groups and cyclic groups of 3 to 12 carbon atoms. Also included within the suitable cycloolefin monomers are the resinous monomers disclosed in copending U.S. application Ser. No. 103,270 and the use of polyfunctional cycloolefins as crosslinkers disclosed in U.S. Pat. No. 4,701,510, these disclosures are incorporated herein by reference.

Specifically preferred monomers are of the norbornene-type defined by the following formulas II, III and IV:

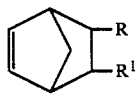 (II)

 (III)

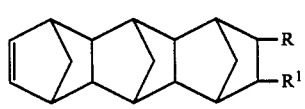 (IV)

R and $R^1$ are independently selected from hydrogen, alkyl, and aryl groups of 1 to 20 carbon atoms, and saturated and unsaturated cyclic groups containing 4 to 12 carbon atoms formed by R and $R^1$ together with the two ring carbon atoms connected thereto. Examples of preferred monomers referred to herein include:
dicyclopentadiene,
methyltetracyclododecene,
hexacycloheptadecene,
methyl hexacycloheptadecene,
2-norbornene,
and other norbornene monomers such as
5-methyl-2-norbornene, 5,6-dimethyl-2-norbornene,
5-ethyl-2-norbornene, 5-ethylidene-2-norbornene,
5-butyl-2-norbornene,
5-hexyl-2-norbornene,
5-octyl-2-norbornene,
5-phenyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-α-naphthyl-2-norbornene,
5-cyclohexyl-2-norbornene,
5,6-dimethyl-2-norbornene,
dihydrodicyclopentadiene (or cyclopentenecyclopentadiene co-dimer),
methyl-cyclopentadiene dimer,
ethyl-cyclopentadiene dimer,
tetracyclododecene 9-ethyl-tetracyclo[6,2,1,1$^{3,6}$,0$^{2,7}$]dodecene-4, (or ethyl-tetracyclododecene)
9-propyl-tetracyclo[6,2,1,1$^{3,6}$,0$^{2,7}$]-dodecene-4,
9-hexyl-tetracyclo[6,2,1,1$^{3,6}$,0$^{2,7}$]dodecene-4,
9-decyl-tetracyclo[6,2,1,1$^{3,6}$,0$^{2,7}$]dodecene-4,
9,10-dimethyl-tetracyclo[6,2,1,1$^{3,6}$0$^{2,7}$]dodecene-4,
9-methyl,10-ethyl-tetracyclo[6,2,1,1$^{3,6}$,0$^{2,7}$]dodecene-4,
9-cyclohexyl-tetracyclo[6,2,1,1$^{3,6}$,0$^{2,7}$]dodecene-4,
9-chloro-tetracyclo[6,2,1,1$^{3,6}$,0$^{2,7}$]dodecene-4,
9-bromo-tetracyclo[6,2,1,1$^{3,6}$,0$^{2,7}$]dodecene-4,
9-fluoro-tetracyclo[6,2,1,1$^{3,6}$,0$^{2,7}$]dodecene-4,
9-isobutyl-tetracyclo[6,2,1,1$^{3,6}$,0$^{2,7}$]dodecene-4,
9,10-dichloro-tetracyclo[6,2,1,1$^{3,6}$,0$^{2,7}$]-dodecene-4.

This invention especially contemplates the use of one or more of the following monomers within the reactive formulations of this invention so as to provide homopolymers and copolymers upon polymerization:
norbornene,
methylnorbornene,
tetracyclododecene,
methyltetracyclododecene,
dihydrodicyclopentadiene,
dicyclopentadiene,
5-ethylidene-2-norbornene,
hexacycloheptadecene,
trimers of cyclopentadiene, and
tetramers of cyclopentadiene.

Copolymers are defined herein as polymers composed of two or more different monomers.

The monomer or mixture of norbornene-type monomers and the polymers obtained therefrom can obtain up to about 20% by weight thereof of cyclopentadiene.

Metathesis Catalyst System

The reactive formulation of this invention contains a metathesis catalyst system. This catalyst system comprises a metathesis catalyst and cocatalyst. The individual feedstock components of this invention only contain one of these elements, i.e., either the metathesis catalyst or cocatalyst. The polymers which form the solid articles of this invention are preferably polymerized with the species identified below. Any metathesis catalyst system which provides ring-opening polymerization of cycloolefin monomers containing a norbornene group may be used in the reactive formulations of this invention. The preferred metathesis catalyst systems will polymerize mixtures of such cycloolefin monomers, or a mixture of at least one such cycloolefin monomer with up to about 20% by weight of cyclopentadiene.

The metathesis catalyst system includes a catalyst and a cocatalyst. The metathesis catalysts useful herein are selected from molybdenum and tungsten compounds. Suitable metathesis catalysts include the molybdenum and tungsten halides, particularly molybdenum pentachloride and tungsten hexachloride, or variations thereof. These species are unstable in air and moisture and therefore, these halides of molybdenum and tungsten should be handled in a dry inert atmosphere such as nitrogen.

The molybdenum and tungsten halides are very reactive in the cycloolefin monomers and start polymerizing the monomer even on standing at room temperature. A polymer begins to form after several hours at room temperature as an undesirable gel or a grainy mass within the monomer. Such compounds are difficult to use in the feedstock components of this invention if lengthy storage is intended.

The preferred metathesis cataysts include the ammonium molybdates and tungstates described in Minchak U.S. Pat. No. 4,426,502. These catalysts can be handled at room temperature in the presence of air and moisture. These catalysts are more stable within the cycloolefin monomers than the tungsten and molybdenum halides and can give stable catalyst/monomer solutions with no signs of monomer polymerization. In a preferred embodiment, the ammonium molybdate and tungstate catalysts are used in a monomer solution to facilitate admixing the catalyst with the other ingredients of the polymerization system.

The ammonium or organoammonium molybdates and tungstates suitable herein as catalysts are defined as follows:

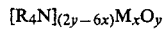

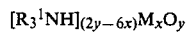

where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups containing from 1 to 20 carbon atoms, and cycloaliphatic groups each containing from 5 to 16 carbon atoms.

In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

The Minchak U.S. Pat. No. 4,426,502, referred to earlier, further defines the catalysts in instances where all or some of the R and $R^1$ groups are the same or different, which disclosure is incorporated as if fully set forth herein.

Specific examples of suitable organoammonium molybdates and tungstates described herein include tridodecylammonium molybdates and tungstates, methyltricaprylammonium molybdates and tungstates, tri(tridecyl)ammonium molybdates and tungstates, and trioctylammonium molybdates and tungstates. Molybdenum (III) acetylacetonate or other organic soluble molybdenum or tungsten halogen-free compounds can be also used as metathesis catalysts herein.

Preferably, the cocatalyst contemplated by this invention are the alkylaluminum halide cocatalysts. The use of alkylaluminum halide cocatalysts in a metathesis catalyst system is well known. U.S. Pat. No. 4,380,617 to Minchak et al. discloses a ring opening polymerization of a cycloolefin with a norbornene group in the presence of an alkylaluminum halide cocatalyst and an organoammonium molybdate or tungstate catalyst.

An especially preferred metathesis catalyst system is the type wherein an alkyl aluminum halide cocatalyst is transformed to at least one alkylalkoxyaluminum halide by reaction with an alcohol, phenol or active hydroxyl-containing compound prior to contact with the tungsten or molybdenum catalyst. U.S. Pat. No. 4,426,502 to Minchak describes bulk polymerization of cycloolefins using a modified cocatalyst with a catalyst whereby polymerization of the cycloolefin monomers can be conducted in absence of a solvent or a diluent. The alkylaluminum halide cocatalyst is modified by pre-reacting it with an alcohol or an active hydroxy-containing compound to form an alkoxyalkylaluminum halide or an aryloxyalkylaluminum halide which is then used in the polymerization reaction. The pre-reaction can be accomplished by using oxygen, an alcohol, or a phenol. As noted at bottom of column 4 of the Minchak patent, hindered phenols do not form the phenoxyaluminum groups and are relatively inert. The alkoxy or aryloxy group on the cocatalyst functions to inhibit the reducing power of the cocatalyst by replacing some of the alkyl groups on the aluminum. This makes it possible to first contact all the catalyst components at ambient temperature and to react cyclic olefins by means of bulk polymerization by thermal activation.

When an unmodified alkylaluminum cocatalyst is used with a catalyst to polymerize a cycloolefin, the reaction is very rapid. In some systems, polymerization is unacceptable since the active catalyst species are quickly encapsulated by polymer formed on contact between the cocatalyst, catalyst and monomer and is, therefore, not able to contact additional monomer present in the system for polymerization to continue. Suitable modifiers are those disclosed by Minchak in U.S. Pat. No. 4,426,502, which is incorporated herein by reference.

As disclosed in U.S. Pat. No. 4,426,502, to be useful in bulk polymerization, as contemplated herein, the cocatalyst preferably contains at least some halogen, some alkoxy or aryloxy groups, and some alkyl groups, along with aluminum. Certain halogen-free cocatalyst can be used to polymerize norbornene-containing cycloolefins in the presence of a suitable metathesis catalyst. The halogen-free cocatalyst suitable for use in bulk polymerization reactions include an alkylaluminum cocatalyst, particularly trialkylaluminum cocatalyst together with a modifier compound selected from alkyltin oxides, particularly bis(trialkyltin) oxides. The halogen-free cocatalysts are referred by by Minchak et al. in U.S. Pat. No. 4,701,510 and incorporated herein.

The alkylaluminum halide or alkyl aluminum cocatalyst that is used in conjunction with the molybdenum or tungsten metathesis catalyst in forming the metathesis catalyst system may be selected from monoalkylaluminum dihalides, $RAlX_2$, dialkylaluminum monohalides, $R_2AlX$, alkylaluminum sesquihalides, $R_3Al_2X_3$, trialkylaluminum, $R_3Al$, used in combination with an iodine source and mixtures thereof. In the formulas for the alkylaluminum halide cocatalyst, R is an alkyl radical containing 1 to 12 carbon atoms, preferably about 2 to 8 carbon atoms, and x is a halogen selected from chlorine, iodine, bromine and fluorine.

Specific examples of such alkylaluminum halides and alkyl aluminums include ethylaluminumdichloride, diethylaluminum iodide, ethylaluminum diiodide, diethylaluminum chloride, propylaluminum dichloride, propylaluminum diiodide, isobutylaluminum dichloride, ethylaluminum dibromide, methylaluminum sesquichloride, methylaluminum sesquibromide, trioctylaluminum, triethylaluminum and triisobutylaluminum.

To activate the metathesis catalyst system, the cocatalyst is reacted with an activator. The activator referred to herein is generally a halometal compound which has the following formula:

$$R_mYX_n$$

where m is 0 to 4 and n is 1 to 5. R is individually selected from organic radicals selected from hydrogen, alkyl, alkenyl, alkoxy, aryl, alkaryl and saturated and unsaturated cyclic groups. The quantity Y is a metal selected from tin, lead, magnesium, antimony, boron, germanium, and silicon. The quantity X is individually selected from halogens which include chlorine, bromine, iodine and fluorine, preferably chlorine.

In a preferred embodiment, the activator is selected from organic chlorosilanes of the following formula:

$$R_mSiX_n$$

where m is 0 to 3, and n is 1 to 4; R is individually selected from hydrogen, alkyl groups of 1 to 12 carbon atoms, alkoxy groups of 1 to 12 carbon atoms, alkenyl groups of 2 to 12 carbon atoms, aryl groups of 6 to 18 carbon atoms, alkaryl groups wherein there is at least one alkyl substituent on the aryl moiety containing 1 to 4 carbon atoms, and saturated and unsaturated monocyclic, dicyclic and polycyclic groups containing a total of 5 to 12 carbon atoms. In an especially preferred embodiment, R is selected from hydrogen, alkyl and alkoxy groups containing 1 to 6 carbon atoms. Specific examples of preferred activators include the following chlorosilanes: dimethylmonochlorosilane, dimethyldichlorosilane, diphenyldichlorosilane, tetrachlorosilane, and the like.

Blowing Agents

The blowing agents contemplated for use in all embodiments of the present invention include those that are enclosed in expansible thermoplastic polymer particles. These blowing agents typically are produced as thermoplastic microspheres that encapsulate a liquid blowing agent.

These microspheres are well known in the art.

For example, Morehouse, Sr. et al. in U.S. Pat. No. 3,615,972 disclose blowing agents encapsulated by expansible thermoplastic polymers. Microencapsulated blowing agents in accordance with Morehouse, Jr. et al. and contemplated by this invention are readily prepared from a wide variety of materials. The microsphere shell must be selected to not dissolve or swell appreciably in the cycloolefin monomers to be useful in this invention. The thermoplastic polymer must be substantially impermeable to the blowing agent within it to obtain the desired expansion of the sphere. Additionally, the thermoplastic polymer cannot be of the type that inactivates the metathesis catalyst or cocatalyst. If the metathesis catalyst is inactivated, polymerization of cycloolefin monomers to a solid rigid mass will not result. The polymers should not contain free hydroxyl groups or acid groups. Furthermore, the thermoplastic polymer should have a softening point below about 180° C. The softening point, as defined herein is the point at which the encapsulant of thermoplastic is expansible. It is desirable for the encapsulant to be expansible at temperatures below about the maximum exothermic temperature of a bulk polymerization reaction. Preferably, the thermoplastic has a softening point in the range of 60° C. to 120° C. and most preferably, 80° C. to 100° C.

Advantageously, the particles in accordance with this invention are usually prepared by providing an aqueous dispersion of (1) organic monomeric materials suitable for polymerization to a thermoplastic resinous material having the desired physical properties and (2) a liquid blowing agent which exerts little solvent action on the encapsulating polymer, and in a quantity in excess of that which is soluble in the encapsulating polymer. The monomeric material is subsequently polymerized to solid spherical particles having a quantity of the liquid blowing agent encapsulated therein as a distinct and separate phase.

Monomers suitable as encapsulating microspheres include alkenyl aromatic monomers. These monomers include compounds having the general formula:

$$\begin{matrix} Ar-C=CH_2 \\ | \\ H \end{matrix}$$

wherein Ar represents an aromatic hydrocarbon radical or an aromatic halohydrocarbon radical of the benzene series. Examples include: styrene, o-methylstyrene, m-methylstyrene, p-methylstyrene, ethyl-styrene, vinylxylene, chlorostyrene, or bromostyrene. Various other styrene derived compounds may be employed such as vinyl benzyl chloride, p-tert-butylstyrene, and the like.

Acrylate monomers alone or in combination with the alkenyl aromatic monomers may also be utilized. Such acrylate-type monomers include monomers of the formula:

$$\begin{matrix} R^1 & O \\ | & \| \\ CH_2=C-C-OR \\ | \\ H \end{matrix}$$

wherein R is selected from the group consisting of hydrogen and an alkyl radical containing from about 1 to 12 carbon atoms and $R^1$ is selected from the group consisting of hydrogen and methyl. Typical acrylate materials which may be used are methyl methacrylate, ethyl acrylate, propyl acrylate, butyl acrylate, butyl methacrylate, lauryl acrylate, 2-ethylhexylacrylate, ethyl methacrylate, and the like.

Copolymers of vinyl chloride, vinylidene chloride, acrylonitrile with vinyl dichloride, vinyl bromide and/or similar halogenated vinyl compounds may be used as the encapsulating polymer for the invention.

Esters, such as the vinyl esters having the formula:

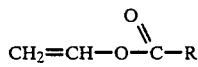

wherein R is an alkyl radical containing from 1 to 17 carbon atoms, may also frequently be employed as monomers. Typical monomers falling within this classification are vinyl acetate, vinyl butyrate, vinyl stearate, vinyl laurate, vinyl myristate, vinyl propionate, and the like.

A wide variety of blowing agents may be incorporated within the polymer system that encapsulates the blowing agent. The blowing agents should vaporize at the softening point of the polymeric shell. Preferably, the blowing agents should vaporize below 0° C. Most preferably, the blowing agents should vaporize below 60° C. Such blowing agents include ethane, ethylene, propane, propene, butane, isobutane, neopentene, acetylene, hexane, heptane, or mixtures of one or more such aliphatic hydrocarbons having a molecular weight of at least 26 and a boiling point below the range of the softening point of the resinous material when saturated with the particular blowing agent utilized.

Other suitable agents include chlorofluorocarbons and tetraalkyl silanes.

Of interest are those microspheres sold under the tradenames EXPANCEL®, MICROLITE® and MIRALITE®. EXPANCEL® is available wet unexpanded, dry unexpanded, wet expanded and dry expanded. EXPANCEL® microspheres have an initial average diameter of 10 to 17 microns and reach an average diameter of 40 to 60 microns when expanded. The diameter of both unexpanded and expanded microspheres is preferably from 2 to 200 microns.

Of particular interest are those microspheres that include a shell consisting of a copolymer of vinylidene chloride and acrylonitrile. The polymeric shell encapsulates the blowing agent, liquid isobutane, under pressure.

Optionally, and especially when structural foams are made, dry, expanded vinylidene chloride microspheres are included in the monomer formulation. Structural foams are those compositions that contain a 10 to 50% by volume void space. Preferably, dry, expanded microspheres available under the tradename EXPANCEL DE 551 are used to make structural foams.

Additives

In addition to the preferred blowing agent of the invention, various additives can be included in the reactive formulation, the feedstock components and solid articles provided by this invention, so as to modify the properties of cycloolefin polymer products. Possible additives include fillers, pigments, antioxidants, light stabilizers, plasticizers, reinforcements, impact modifiers and internal mold release agents. Because of the rapid polymerization time, the additives must be incorporated in the reactive formulation before the cycloolefin monomer sets up in the mold. It is often desirable that the additives be combined in the feedstock components of this invention before being injected into the mold.

Reinforcing materials such as fiberglass mat or preforms may also be added to modify the properties of the cycloolefin polymer product of the invention. If these materials are such that the monomeric reaction streams can readily flow around them, then the reinforcing material may be charged to the mold cavity prior to charging the reaction streams. One class of possible reinforcing materials are those which can increase the polymer's flexural modulus with only a small sacrifice in impact resistance. Possible fillers include glass, wollastonite, mica, carbon black, talc, and calcium carbonate.

The exact amount of filler depends upon the needs and preferences of the practitioner.

Solid Molded Articles

The solid articles provided by this invention are preferably formed by a reaction injection molding process. These solid articles can contain from 0.05 to 5.0 weight percent unexpanded encapsulated blowing agent. Pre-expanded encapsulated microspheres are generally used for foams; from 1.0 to 50.0 volume percent of pre-expanded encapsulated microspheres can be used.

Preferred solid articles have at least two finished surfaces, which is a result of the enhanced mold fill provided by the expanding encapsulant. Where unexpanded microspheres are used, the spheres expand significantly during molding. A density gradient can be obtained which corresponds to the temperature profile of the part during molding. Evidence of this density gradient is the low density obtained compared to parts without the microspheres.

Other preferred embodiments are solid articles reinforced with fiber mat, either woven or unwoven. The fibers can be synthetic, glass or carbon. This invention will reduce the "pop-through" of fibers on the surface and where the matrix is opaque, no fibers should be visible to the unaided eye.

Polymerization Feedstocks

In preferred embodiments, the reactive formulations and feedstock compositions are suitable for use in a RIM process. The two parts of the metathesis-catalyst system are each mixed with monomer and the microencapsulated blowing agent is added to one or both to form either one or two different feedstock components of the present invention. These mixtures are preferably storage stable, i.e., remain gel free for over 30 days. These mixtures provide a source for two separate reactant streams which are combined in a RIM machine's mixing head and then injected into a preheated mold where they quickly polymerize into a cellular structure. It will be obvious to one skilled in the art that there may be situations where it is desirable to have a monomer or microencapsulated blowing agent incorporated in just one reactant stream or to employ a plurality of reactant streams where the additional reactant streams contain monomer or additives or both.

Mixing of the reactant streams is easy to achieve because the process involves low molecular weight, rapidly diffusing components. Typically the mixing heads have orifices about 0.032 inch in diameter and a jet velocity of about 400 ft./sec. After being combined, the mixture is injected into a mold maintained from about 50° C. to about 120° C., preferably from about 60° C. to about 90° C. The mold pressure is in the range of about 5–50 psi. A rapid exothermic reaction occurs as the polymer sets up into a cellular structure.

The following examples illustrate particular embodiments of the invention. It is emphasized that not all embodiments of this invention are illustrated with those particularity given below.

EXAMPLES

Examples 1–3 and Comparative Examples A–D show the physical properties of placques produced from the polymerization of the reactive formulations of this invention obtained from the feedstock components, also provided by this invention.

Component A consisted of a combination of Formulation A100 (0.5) with a n-propyl alcohol/aluminum cocatalyst molar ratio of 0.5 and Formulation A100 (0.75) with a n-propyl alcohol/aluminum cocatalyst molar ratio of 0.75 in a proper ratio to provide a n-propyl alcohol/aluminum cocatalyst molar ratio of 0.60. Table 1 refers to the composition of Formulation A100 (0.5). Table 2 refers to the composition of Formulation A100 (0.75).

TABLE 1

| FORMULATION A100 (.5) COMPOSITION | | |
|---|---|---|
| Compound | Wt. % | Lbs. |
| Dicyclopentadiene | 87.24 | 349.05 |
| Ethylidene Norbornene | 8.30 | 33.20 |
| Diene 55 | 1.75 | 7.00 |
| Kraton D-1102 | 1.75 | 7.00 |
| n-propanol | .12 | .49 |
| Diethyl Aluminumchloride | .49 | 1.97 |
| Silicon Tetrachloride | .35 | 1.39 |
| Total | 100.00 | 400.10 |

TABLE 2

| FORMULATION A100 (.75) COMPOSITION | | |
|---|---|---|
| Compound | Wt. % | Lbs. |
| Dicyclopentadiene | 87.19 | 349.05 |
| Ethylidene Norbornene | 8.29 | 33.20 |
| Diene 55 | 1.75 | 7.00 |
| Kraton D-1102 | 1.75 | 7.00 |
| n-propanol | .19 | .74 |
| Diethyl Aluminumchloride | .49 | 1.97 |
| Silicon Tetrachloride | .35 | 1.39 |
| Total | 100.00 | 400.35 |

A charge of component A was formed as shown in the recipe of Table 1 and Table 2 and described hereinafter. The Diene 55 butadiene rubber (Firestone Corp.), Kraton D-1102 styrene butadiene block copolymer (Shell Chemical Co.), dicyclopentadiene (99% pure, Velsicol) and ethylidene norbornene (Union Carbide) were placed in a reaction vessel (about 60 gallons) equipped with an impellar. Then an additional 17 lbs. of dicyclopentadiene and 3 lbs. ethylidene norbornene were added. The system was then set up for a vacuum stripping operation wherein the vacuum was adjusted to 25–50 mmHg. The system then was heated in the reactor to 85° to 95° C. to allow time for the rubber to dissolve. Then 20 lbs. of the dicyclopentadiene/ethylidene norbornene/water azeotrope was stripped from the system.

The order of addition of the diethyl aluminum chloride, n-propyl alcohol (or n-propanol) and silicon tetrachloride is very important to prevent crosslinking of the rubber. The amount of n-propyl alcohol was weighed in a 1 quart bottle and diluted with about 600 grams of the dicyclopentadiene solution from the reactor. The system in the reactor was then charged with neat diethyl aluminum chloride, then the diluted n-propyl alcohol solution followed by silicon tetrachloride. The system was then mixed for 15 minutes. Thereafter, a vacuum was pulled on the tank. The system was degassed about 1 hour at about 20 inches of vacuum with slow agitation. One liter samples were taken for testing whereas the remaining solution was transferred to a plastic lined drum with a nitrogen purge.

Component B consisted of a solution of Formulation B100 (2112). Table 3 refers to the composition of Formulation B100 (2112).

TABLE 3

| FORMULATION B100 (2112) COMPOSITION | | |
|---|---|---|
| Compound | Wt. % | Lbs. |
| Dicyclopentadiene | 85.50 | 342.01 |
| Ethylidene Norbornene | 8.12 | 32.49 |
| Diene 55 | 1.75 | 7.00 |
| Kraton D-1102 | 1.75 | 7.00 |
| Mark 2112 | 2.00 | 8.00 |
| Molybdate Catalyst Solution | .88 | 3.50 |
| Total | 100.00 | 400.00 |

A charge of component B was formed as shown in the recipe of Table 3 as described hereinafter. The Diene 55 and Kraton D-1102 polymers, Mark 2112 phosphite antioxidant (Argus), dicyclopentadiene and ethyl norbornene were placed in a reaction vessel. Then an additional 17 lbs. of dicyclopentadiene and 3 lbs. of ethylidene norbornene were added. The system was then set up for a vacuum stripping operation wherein the vacuum was adjusted to 25–50 mmHg. The system was then heated in a reactor to 80°–95° C. allowing time for the rubber to dissolve. Then 20 lbs. of a dicyclopentadiene/ethylidene norbornene/water azeotrope was stripped from the system. The molybdate catalyst solution (48 weight percent in a 90/10 weight ratio dicyclopentadiene/ethylidene norbornene) of the formula $[(C_{12}H_{25})_3NH]_4Mo_8O_{26}$ was then added to the system and mixed for 30 minutes. Thereafter, a vacuum was pulled on the tank and the bottom drain valve was bumped using nitrogen. The system was degassed about 1 hour at about 20 inches of vacuum with slow agitation. One liter samples were taken for testing whereas the remaining solution was transferred to a plastic lined drum with a nitrogen purge.

Molding Procedures

A Krauss-Maffei reaction injection molding machine was used with 20 gallon reservoirs for the components A and B in which composition adjustments were made.

The following molding parameters were held substantially constant throughout Examples 1–3: viscosity of formulation (100 cps); reactant temperature (35° C.); Component A/Component B Ratio (1.0); Propyl Alcohol/Aluminum cocatalyst mole ratio (0.70); Top Mold Temperature (60° C.); Bottom Mold Temperature (70° C.) and Cure Time (1.0 min.). To obtain a propyl alcohol/aluminum cocatalyst molar ratio for the combined components of about 0.70, component A was formed from a 40/60 weight ratio mixture of Formulations A100 (0.5) and A100 (0.75) and additional n-propyl alcohol was added to the B component in the form of a 10% by weight solution of 90/10 DCPD/ENB. Also added to the B component was Expancel 551 DU microspheres marketed by Expancel. These microspheres were wetted in a small portion of component B and added to the component B reservoir and mixed thoroughly. These A and B components are examples of the feedstocks provided by this invention.

The mold used consisted of two individually heated plates with an ungasketed square annular spacer. A hole through the top plate formed a center gate for the placques formed. The placques formed had a length, width and thickness of 24 in., 18 in. and ⅛ in., respectively. Because of the moisture and oxygen sensitivity of the cocatalyst and because the dicyclopentadiene reaction injection molding formulation shrinks as it polymerizes pulling moist air into the mold cavity, wet monomer surfaces were common when molding without Expancel 551 DU. When Expancel 551 DU was added to the B component, the shrinkage was counteracted resulting in dry surfaces. Furthermore, because expansion took place in the middle of the placque, both placque surfaces were kept in contact with the mold surface duplicating their respective surface qualities.

EXAMPLE 1

Components A and B as described above were blended in the Krauss Maffei RIM machine at a ratio of about 1.0 and injected into a mold as described above. Added to the B component was Expancel 551 DU. Two runs were made, X and Y. See Table 4 for physical properties of the molded placques obtained.

COMPARATIVE EXAMPLE A

Components A and B as described above were blended and molded as described in Example 1. No Expancel 551 DU was added to the B component. Two runs were made, "i" and "ii". See Table 4 for physical properties of the placques obtained.

TABLE 4

| Physical Properties for Example 1 and Comparative Example A | | | | |
|---|---|---|---|---|
| | Example 1 | | Comparative Example A | |
| | (X) | (Y) | i | ii |
| % Conversion | 96.5 | 93.2 | 95.4 | 94.9 |
| Wt. % Expancel | .21 | .21 | 0 | 0 |
| Wt. % Glass Mat | 0 | 0 | 0 | 0 |
| Izod @ RT (ft lb/in) | 5.4 | 6.5 | 6.5 | 8.1 |
| Izod @ −40° C. (ft lb/in) | 1.1 | 2.0 | 2.4 | 2.3 |
| HDT (°C.) | 95.0 | 94.3 | 98.8 | 97.5 |
| Flexural Modulus 1000 psi | 214 | 236 | ·217 | 226 |
| Flexural Strength 1000 psi | 8.9 | 9.9 | 9.2 | 9.8 |

Heat distortion temperature (HDT) was determined by ASTM D-648. Izod impact strengths were measured according to ASTM D-256 and Flexural modulus and strength were determined by the procedures in ASTM D-790. These standards were used throughout all the examples.

This data shows that the additional Expancel 551 DU microspheres at low levels does not significantly detract from the physical properties of the molded products obtained and reduces the degree of monomer conversion only slightly.

EXAMPLE 2

Components A and B were blended to form reactive formulations and molded into solid parts as described in Example 1. Added to the B component was Expancel 551 DU. Fiberglass mat (Owens Corning Fiberglass M-8610) was positioned in the mold and Expancel 551 DU was added in amounts calculated to give 24.5 weight percent and 0.21 weight percent, respectively, in the placque formed. See Table 5 for the physical properties of the molded placques obtained.

COMPARATIVE EXAMPLE B

Components A and B were blended and molded as described above in Example 1. Positioned in the mold was 24.5 weight percent fiberglass mat as used in Example 2. Expancel 551 DU was not added to component B. Two runs were made, "i" and "ii". See Table 5 for physical properties of the molded placques obtained.

TABLE 5

| Physical Properties for Example 2 and Comparative Example B | | | |
|---|---|---|---|
| | | Comparative Example B | |
| | Example 2 | i | ii |
| % Conversion | 91.4 | 93.6 | 92.8 |
| Wt. % Expancel | .21 | 0 | 0 |
| Wt. % Glass Mat | 24.5 | 24.5 | 24.5 |
| Izod @ RT (ft lb/in) | 12.5 | 9.9 | 9.7 |
| Izod @ −40° C. (ft lb/in) | 10.8 | 10.6 | 9.6 |
| HDT (°C.) | 129.5 | 124.8 | 128.5 |
| Flexural Modulus 1000 psi | 490 | 497 | 505 |
| Flexural Strength 1000 psi | 15.6 | 15.3 | 14.7 |

Physical properties were measured as described in Example 1. The data in Table 5 demonstrate that physical properties of highly reinforced parts are not reduced where Expancel 551 DU is added and the degree of monomer conversion is only slightly reduced.

EXAMPLE 3

In Example 3, the procedures of Example 2 were repeated in molding sample placques except that lower loading of fiberglass mat were used (13.25 wt. percent). The physical properties of the parts obtained are shown in Table 6.

COMPARATIVE EXAMPLE C

In this example the procedures of Example 3 were followed in molding sample placques except that no Expancel 551 DU was added to the B component. See Table 6 for physical properties of the parts obtained.

TABLE 6

| Physical Properties for Example 3 and Comparative Example C | | |
|---|---|---|
| | Example 3 | Comparative Example C |
| % Conversion | 93.9 | 94.5 |
| Wt. % Expancel | .21 | 0 |
| Wt. % Glass Mat | 13.75 | 13.25 |
| Izod @ RT (ft lb/in) | 8.5 | 8.4 |
| Izod @ −40° C. (ft lb/in) | 6.0 | 7.0 |
| HDT (°C.) | 120.8 | 126.8 |
| Flexural Modulus 1000 psi | 363 | 362 |
| Flexural Strength 1000 psi | 12.0 | 13.3 |

Physical properties were measured as described in Example 1. The data in Table 6 shows only a minor loss in physical properties and degree of monomer conversion for reinforced parts with low fiberglass loadings where microencapsulated blowing agents are added.

Microencapsulants as Blowing Agents

To demonstrate the microencapsulants function as blowing agents, a comparison was made between the density of parts obtained utilizing encapsulated blowing agent (Example 1) and parts made without such encapsulants (Comparative Example D).

COMPARATIVE EXAMPLE D

A placque was proeduced from the polymerization of a mixture of components A and B as described above in an A/B ratio of 1.21. The molding parameters include: viscosity of formulation (100 cps); reactant temperature (35° C.); propyl alcohol/aluminum cocatalyst molar ratio (0.62); top mold temperature (60° C.); bottom mold temperature (70° C.) and cure time (1.0 min.). The B component used to make the placque did not include Expancel. The reactive formulation had a density of 0.97 gms/cm$^3$. The placque made from this formulation had a density of 1.03 gm/cm$^3$.

The reactive formulation of Example 1 had a substantially similar density of 0.9705 gms/cm$^3$ to that of Comparative Example D. However, the placque made from the formulation of Example 1 (including 0.21 wt. % Expancel 551 DU) had a density of 0.93 gms/cm$^3$. Expancel 551 DU has a true density of 1.3 gms/cm$^3$. This low density for the molded part demonstrates the encapsulants have expanded within the part, functioning as blowing agents.

Enhancement of Mold Fill with Microencapsulants

Examples 4–6 demonstrate that proper mold fill can be obtained with proper loadings of encapsulated blowing agent.

Examples 4–6 were prepared in beverage bottles that were dried for at least 1 hour at 105° C. The bottles were then removed and cooled to room temperature under nitrogen purge. Comonomers (dicyclopentadiene/ethylidene norbornene), elastomer (Diene 55) and antioxidant (Mark 2112) as described in Example 1 were added to the bottle and the mixture rolled until dissolved. Alcohol (n-propanol), diethyl aluminum chloride and silicon tetrachloride were sequentially added with thorough mixing between additions, vacuum applied until degassed, then relieved with nitrogen, before adding the molybdate solution (0.0125M molybdate solution as in Example 1). The bottle was fitted with a pouring spout with a nitrogen inlet, inverted and the formulation injected into a nitrogen purged mold at 60° C. The temperature of mold ingredients was monitored and recorded with a thermocouple approximately 1–1.5 cm. from the edge of the placque. The time of the beginning of exothermic reaction was recorded (Ex..E.T. minutes) as was the peak exothermic temperature (Max. Temperature). After 5 minutes from the peak of exotherm, the mold was opened and the placque was removed. Percent monomer conversion was determined by thermal gravimetric analysis with a DuPont 1090 thermal analyzer, using 400° C. as the point at which all volatiles given off were considered unreacted monomer. The percentage of the original weight remaining at 400° C., corrected for nonpolymeric ingredients, is reported as the percent conversion. Physical properties measured were as reported in Example 1.

EXAMPLE 4

A reaction injection molding formulation was prepared as described above. Added to the formulation was 0.4 gms. (0.2 weight percent of total) of Expancel 551 DU marketed by Expancel. The formulation polymerized before it could be put into the mold. This demonstrates the Expancel 551 DU is compatible with the metathesis catalyst system of the reactive formulation. See Table 7 for compositions.

EXAMPLE 5

A reaction injection molding formulation was prepared as described above with more n-propanol to reduce the cocatalyst activity. Added to the formulation was 0.4 gms (0.2 weight percent of total) of Expancel 551 DU marketed by Expancel. Shallow sink marks were evident in the placque on one side. This example demonstrates that the activity of the metathesis catalyst system can be controlled with the microencap-sulated Expancel 551 DU present. This level of Expancel 551 DU approaches the low end of the functional range yet sink marks are removed from both sides of a molded placque. See Table 7 for the reactive formulation composition, the physical properties of the placque obtained and the polymerization characteristics.

EXAMPLE 6

A reaction injection molding formulation was prepared as described above. Added to the formulation was 0.8 gms (0.4 weight percent of total) of Expancel 551 DU. No sink marks were visible on either side. A much lighter color was obtained compared to the placque in Example 5. This example demonstrates that with proper loadings, adequate mold fill and excellent "appearance" surfaces can be accomplished on both sides of a molded placque. See Table 7 for reactive formulation composition, the physical properties of the placque and the polymerization characteristics.

TABLE 7

| Composition and Physical Properties for Example 4, Example 5 and Example 6 | | | |
|---|---|---|---|
| | Example 5 | Example 6 | Example 4 |
| Dicyclopentadiene/Ethylidene Norbornene Ratio | 9.0 | 9.0 | 9.0 |
| Dicyclopentadiene/Ethylidene Norbornene Wt. (gms) | 155.8 | 155.8 | 155.8 |
| .5M Diethyl Aluminum Chloride (mls) | 8.0 | 8.0 | 8.0 |
| 1.0M n-propanol (mls) | 4.8 | 4.8 | 4.4 |
| 0.0125M[(C$_{12}$H$_{25}$)$_3$NH]$_4$Mo$_8$O$_{26}$ (mls) | 10.0 | 10.0 | 10.0 |
| .25M SiCl$_4$ (mls) | 8.0 | 8.0 | 8 0 |
| Mold Temperature (°C.) | 60 | 60 | 60 |
| Propanol/aluminum ratio | 1.2 | 1.2 | 1.1 |
| Antioxidant (Mark 2112) (gms) | 4 | 4 | 4 |
| Diene 55 (gms) | 5.0 | 5.0 | 5.0 |
| Expancel 551 DU (gms) | .4 | .8 | .4 |
| Ex. E. T. (minutes) | 1.0 | 1.6 | — |
| Max Temperature (°C.) | 184 | 171 | — |
| % Conversion | 97.4 | 91.0 | |
| Initial Izod @ RT (ft. lb./in.) | 10.9 | 10.1 | — |
| Initial Izod @ −40 (ft. lb./in.) | 1.6 | 1.6 | — |
| HDT (°C.) | 106 | 109 | — |
| Flexural (Elastic) Modulus (1000 psi) | 247 | 228 | — |
| Max Stress (1000 psi) | 10.2 | 9.5 | — |
| Tensile Yield Stress | 6122 | 5855 | — |
| % Yield Elongation | 6.7 | 6.3 | — |

TABLE 7-continued

Composition and Physical Properties
for Example 4, Example 5 and Example 6

|  | Example 5 | Example 6 | Example 4 |
|---|---|---|---|
| % Break Elongation | 30.7 | 45.5 | — |

Glass Mat Molding With Microencapsulants

EXAMPLE 7

A reaction injection molding formulation was prepared and polymerized as described above for Examples 4–6 with the exception that Krayton D-1102 impact modifier was used and the 9"×7"×1/16" center gated placque mold contained preplaced 2.0 oz/ft$^2$ Owens Corning Fiberglass mat M-8610. Added to the formulation was 0.3 gms of Microlite 126 (0.2 weight percent of total) marketed by Pierce & Stevens Industrial Group. The formulation was not degassed. The placque obtained weighed about 119 gms and contained about 30% glass. The molded placque released very well from the surface of the mold coated with an epoxy film. The molded placque stuck to the untreated surface. This placque demonstrated a large reduction in fibers popping through the surface of the placque when compared to similar placques not made with Microlite 126. See Table 8 for the reactive formulation composition and polymerization conditions.

EXAMPLE 8

A reaction injection molding formulation was prepared and polymerized as described above in Example 7 except that the glass mat was higher in weight (38.5 gms). Added to the formulation was 0.3 gms of Microlite 126 (0.2 weight percent of total) as in Example 7. The placque obtained weighed about 122 gms and contained about 32% glass. In molding the placque, both mold surfaces were coated with epoxy. The formulation was not degassed. The molded placque stuck slightly on the original epoxied surface. This example demonstrates that proper mold fill can be obtained with glass mat reinforced bulk polymerized cycloolefin monomers where microencapsulated blowing agents are introduced to the formulation. The microencapsulated blowing agents were not "filtered out" of the formulation by the glass mat. Again, fibers popping through the surface of the placque were much reduced. See Table 8 for the reactive formulation composition and polymerization details.

TABLE 8

Compositions for Example 7 and Example 8

|  | Example 7 | Example 8 |
|---|---|---|
| Dicyclopentadiene/Ethylidene Norbornene Ratio | 9 | 9 |
| Dicyclopentadiene/Ethylidene Norbornene Wt. (gms) | 130.0 | 130.0 |
| .5M Diethyl Aluminum Chloride (mls) | 6.0 | 6.0 |
| 1.0M n-propanol (mls) | 1.2 | 1.2 |
| 1.0M neopentyl alcohol (mls) | 1.2 | 1.2 |
| 0.0125M[(C$_{12}$H$_{25}$)$_3$NH]$_4$Mo$_8$O$_{26}$ (mls) | 7.5 | 7.5 |
| .25M SiCl$_4$ (mls) | 6.0 | 6.0 |
| Mold Temperature (°C.) | 80 | 80 |
| Kraton D-1102 (gms) | 5.25 | 5.25 |
| Microlite 126(gms) | 0.3 | 0.3 |
| Glass Mat M8610 (oz/ft) | 2 | 2 |
| % Glass | 30 | 32 |
| Time of exotherm (min.) | 1.5 | 1.6 |
| Max Temperature (°C.) Exotherm | 83 | 82 |

EXAMPLES 9–14

Proper Loading of Encapsulated Blowing Agent

Examples 9–14 demonstrate that polymerization is enhanced with proper loading of encapsulated blowing agent.

Examples 9–14 were prepared as described above in Examples 4–6. See Table 9 for reactive formulation composition.

TABLE 9

Compositions for Examples 9–14

|  | Examples | | | | | |
|---|---|---|---|---|---|---|
|  | 9 | 10 | 11 | 12 | 13 | 14 |
| Dicyclopentadiene/Ethylidene Norbornene Ratio | 12.3 | 12.3 | 12.3 | 12.3 | 12.3 | 12.3 |
| Dicyclopentadiene/Ethylidene Norbornene Weight (gms) | 25.0 | 25.0 | 25.0 | 25.0 | 124.0 | 165.4 |
| .5 M Diethyl Aluminum Chloride (mls) | 1.0 | 1.0 | 1.0 | 1.0 | 6.0 | 8.0 |
| 1.0 M n-propanol (mls) | 0.25 | 0.13 | 0.13 | 0 | 1.8* | 0.0 |
| 0.0125 M [(C$_{12}$H$_{25}$)$_3$NH]$_4$Mo$_8$O$_{26}$ (mls) | 1.25 | 1.25 | 1.25 | 1.25 | 7.5 | 10.0 |
| 0.25 M SiCL$_4$ (mls) | 1.0 | 1.0 | 1.0 | 1.0 | 6.0 | 8.0 |
| Mold Temperature (°C.) | 80 | 100 | 100 | 100 | 80 | 80 |
| Propanol/Aluminum Ratio | 0.50 | 0.25 | 0.25 | .00 | 0.6* | 0 |
| Kraton D1102 (gms) | — | — | — | — | 4.66 | 6.21 |
| Expancel 551DU (gms) | | | | | | |
| wt. (gms) | 25.0 | 8.3 | 2.8 | 1.30 | — | 12.8 |
| wt. % | 46.7 | 22.6 | 9.0 | 4.4 | — | 6 |
| Expancel 551DE (gms) | | | | | | |
| wt. (gms) | — | — | — | — | 5.57 | — |
| vol. % | — | — | — | — | 50 | — |
| Ex. E.T. (minutes) | — | — | — | — | 13.3 | 5.2 |
| Max Temperature C.) | — | — | — | — | 105 | 173 |

*1.0 M DMPOH mls (DMPOH = 2,4 dimethyl-3-pentanol)

Examples 9, 10 and 11 containing 46.7, 22.6 and 9.0 weight percent Expancel 551 (DU), respectively, exhibited no polymerization. Example 12 containing 4.4 weight percent Expancel 551 (DU) exhibited polymerization.

Example 14 containing 6.0 weight percent Expancel 551 DU added to a nonalcohol modified cocatalyst formulation achieved 81.4% conversion. Low conversion indicates the Expancel 551 Du level was somewhat too high.

Example 13 containing 50 volume percent Expancel 551 DE added to a typical alcohol modified cocatalyst formulation achieved. 88.1% conversion. To achieve higher conversion the alcohol content could be lowered. The reason for the 50 volume percent limitation is that at this concentration the mixture starts to lose its fluidity. At a slightly higher concentration, the mixture becomes too thick to efficiently process via RIM.

Example 13 and Example 14 were repeated using nitrogen dried microencapsulant within the formulations. The data comparing nitrogen dried microencapsulant to the "as is" microencapsulant used in Example 13 and Example 14 is inconclusive. The formulations used in Example 13 and Example 14 using nitrogen dried Expancel DU and nitrogen dried Expancel DE, respectively, showed a percent conversion of 82.1 and 69.6, respectively.

Comparing these values to the percent conversions described above for Example 14 shows that when dried Expancel DU was used the percent conversion increased and when dried Expancel DE was used the percent conversion decreased.

While this invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A solid molded article which comprises polymers obtained by bulk ring-opened polymerization of cycloolefin monomers having a norbornene functional group and having dispersed within these polymers expanded microspheres comprised of
a synthetic thermoplastic resin shell having a softening point at a temperature below 180° C. that encapsulates a liquid blowing agent when unexpanded, said synthetic thermoplastic shell being substantially impermeable to said liquid blowing agent.

2. A solid molded article as in claim 1 having at least two finished opposing surfaces with no voids.

3. A solid molded article as in claim 1 which is reinforced with a fiber mat wherein said fibers are selected from the group consisting of glass fibers and polyester fibers.

4. A solid molded article as in claim 1, wherein the blowing agent within the microspheres is selected from the group consisting of ethane, ethylene, propane, propene, butane, isobutane, neopentene, acetylene, hexane, heptane and mixtures thereof and the encapsulant is a synthetic resinous thermoplastic having a softening point within the range of 60° to 120° C.

5. A solid molded article as in claim 1 wherein unexpanded microspheres are present in a quantity ranging from 0.05 to 5.0 weight percent of the cycloolefin monomer charge used to form the solid molded article.

6. A solid molded article as in claim 5 wherein unexpanded microspheres are present in a quantity ranging from 0.2 to 1.0 weight percent of the cycloolefin monomer charge used to form the solid molded article.

7. A solid molded article as in claim 1 having a cross-sectional density gradient which corresponds to the cross-sectional temperature profile of the article during molding.

8. A solid molded article in accordance with claim 1 which is a foam comprising from 1.0 to 50.0 volume percent expanded microspheres.

9. A solid molded article as in claim 1 wherein the article is completely devoid of surfactant.

10. A solid molded article which comprises polymers obtained by bulk ring-opened polymerization of cycloolefin monomers having a norbornene functional group and having dispersed within these polymers unexpanded microspheres comprised of
a synthetic thermoplastic resin shell having a softening point at a temperature below 180° C. that encapsulates a liquid blowing agent when expanded, said synthetic thermoplastic shell being substantially impermeable to said liquid blowing agent.

11. A solid molded article as in claim 10 having at least two finished opposing surfaces with no voids.

12. A solid molded article as in claim 10 which is reinforced with a fiber mat wherein said fibers are selected from the group consisting of glass fibers and polyester fibers.

13. A solid molded article as in claim 10 wherein the blowing agent within the microspheres is selected from the group consisting of ethane, ethylene, propane, propene, butane, isobutane, neopentene, acetylene, hexane, heptane and mixtures thereof and the encapsulant is a synthetic resinous thermoplastic having a softening point within the range of 60° to 120° C.

14. A solid molded article as in claim 10 wherein expanded microspheres are present in a quantity ranging from 0.05 to 5.0 weight percent of the cycloolefin monomer charge used to form the solid molded article.

15. A solid molded article as in claim 14 wherein expanded microspheres are present in a quantity ranging from 0.02 to 1.0 weight percent of the cycloolefin monomer charge used to form the solid molded article.

16. A solid molded article as in claim 14 wherein the expanded microspheres are present in a quantity ranging from 0.2 to 1.0 weight percent of the cycloolefin monomer charge used to form the solid molded article.

17. A solid molded article as in claim 10 having a cross-sectional density gradient which corresponds to the cross-sectional temperature profile of the article during molding.

18. A solid molded article in accordance with claim 10 which is a foam.

19. A solid molded article as in claim 10 wherein the article is completely devoid of surfactant.

* * * * *